United States Patent
Rose

[15] 3,651,696
[45] Mar. 28, 1972

[54] LINEARIZED RESISTANCE BRIDGE CIRCUIT OPERABLE IN PLURALITY FROM A COMMON POWER SUPPLY

[72] Inventor: Robert C. Rose, Minneapolis, Minn.
[73] Assignee: Rosemount Engineering Company, Eden Prairie, Minn.
[22] Filed: July 15, 1969
[21] Appl. No.: 841,906

[52] U.S. Cl..................73/362 AR, 323/75 H, 323/75 N
[51] Int. Cl. ..............................................G01k 7/20
[58] Field of Search................73/362 AR; 323/75 H, 75 N

[56] References Cited

UNITED STATES PATENTS

| | | | |
|---|---|---|---|
| 3,429,178 | 2/1969 | Durbin | 323/75 N X |
| 3,341,757 | 9/1967 | Cate | 323/75 N X |
| 3,349,321 | 10/1967 | Arksey | 323/75 N |
| 3,379,973 | 4/1968 | Walton | 73/362 R X |
| 3,453,536 | 7/1969 | Lode | 73/362 R X |

Primary Examiner—Louis R. Prince
Assistant Examiner—Frederick Shoon
Attorney—Dugger, Peterson, Johnson & Westman

[57] ABSTRACT

A bridge circuit suitable for platinum resistance thermometers having three lead wires. An operational amplifier varies the bridge excitation current in response to the bridge output to effect a desired degree of linearization or curve shaping between the sensing resistance and bridge output. The output is referenced to ground and a plurality of such bridges may be operated from a common power supply having a ground tap thus providing a flexible measuring system suitable for multipoint, continuous or scanning operations.

9 Claims, 1 Drawing Figure

PATENTED MAR 28 1972
3,651,696
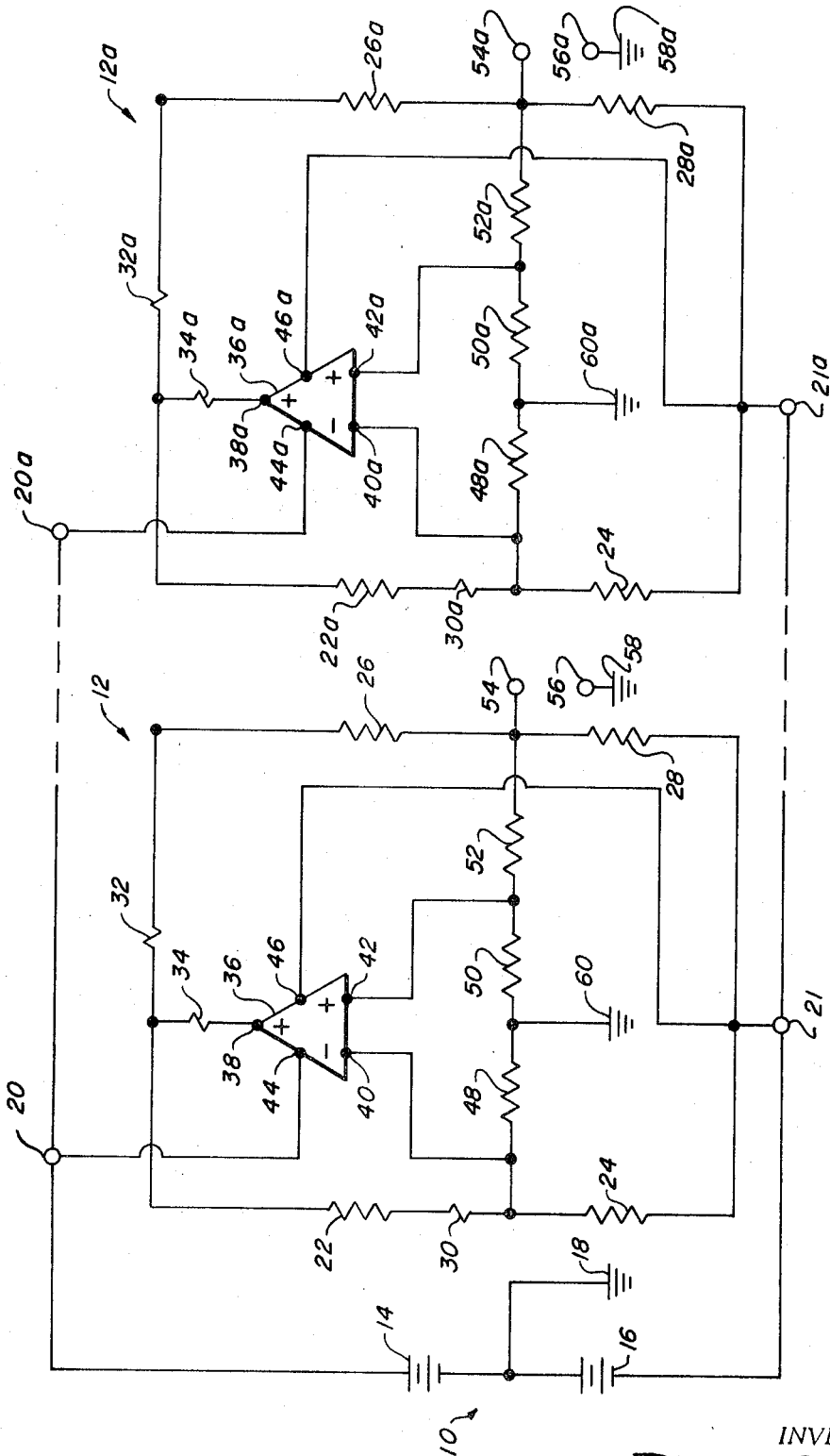
INVENTOR.
ROBERT C. ROSE
BY
Dugger, Peterson, Johnson & Westman
ATTORNEYS

LINEARIZED RESISTANCE BRIDGE CIRCUIT OPERABLE IN PLURALITY FROM A COMMON POWER SUPPLY

BACKGROUND OF THE INVENTION

1. Field of the Invention

This invention relates to resistance measuring means and pertains particularly to resistance bridge systems where a linearized output signal is obtained through control of bridge excitation.

2. Prior Art an bridge circuits have been used in the past to provide a voltage signal linearly proportional to a measurand by using a active circuit to perform a linearizing function. An advanced circuit is described in my U.S. Pat. No. 3,406,331 where, in a specific example, the bridge excitation is varied in accordance with the resistance of a platinum thermometer to provide an output linearly proportional to temperature. That circuit provides an output signal which is floating with respect to the power supply and is most suitable for single point measurement.

A resistance bridge system suitable for measuring a number of temperatures, either continuously or in a scanning mode, and operable from a common power supply is taught in U.S. Pat. No. 3,453,536 assigned to the same assignee as my above mentioned patent. However, this latter patent makes no provision for linearization of the output signals with respect to temperature and thus falls short of the objectives of the present invention.

One object of the invention is to provide a desired amount of linearity in the output signal from a resistance bridge with respect to the resistance of a sensor where the resistance of the sensor changes in accordance with the magnitude of a variable condition. More specifically, the invention has for an aim the obtaining of a high degree of linearity with respect to temperature variations where a resistance-type sensor, such as a platinum resistance thermometer, is used to determine the temperature changes.

Another object is to provide a resistance bridge circuit of the foregoing character that lends itself readily to inclusion with other similar bridge circuits, all of which are supplied from a common power source. In this regard, the present invention envisages the scanning of the plural output signal terminals with excellent comparative accuracy due to the utilization of a common ground for the power source and the individual circuits supplied therefrom.

Yet another object of the invention is to provide a linearized bridge circuit that can be manufactured relatively inexpensively and which will be exceedingly rugged, the latter attribute rendering this type of circuit especially suitable for installation on various types of aircraft.

A still further object is to provide a bridge circuit in which changes can be made with respect to the resistance components so as to adapt the bridge for use with different types of resistance sensors and still obtain the desired output signal curve shape.

SUMMARY OF THE INVENTION

Briefly, this invention provides a resistance bridge circuit design which is preferably energized by means of a tapped power supply where the tap serves as a ground reference. An operational amplifier having a differential input is excited directly from the power supply and its output connects to an input terminal of the bridge. One of the amplifier input terminals connects directly between a particular junction or point on the bridge and a relatively low resistance to ground. Another bridge junction constitutes an output terminal and connects to ground through a relatively high resistance. The output signal representing the measurand appears between the above-mentioned output terminal and a second output terminal connected directly to ground. A precisely determined fraction of this output signal is sensed at the other input terminal to the amplifier and thus provides a linearizing control of the relation between the resistance of a particular bridge arm and the output signal.

This bridge design is herein described with reference to platinum resistance thermometers. It will be shown that a number of such bridges may be operated from a common power supply and in such instances the individual bridge output signals are available for voltage scanning equipment, for example.

BRIEF DESCRIPTION OF THE DRAWING

The sole FIGURE is a schematic diagram showing two bridge systems complete with linearizing circuitry and connected to a common power supply.

DESCRIPTION OF THE PREFERRED EMBODIMENT

Referring to the drawing and the reference notations thereon, the single FIGURE shows a power supply designated generally at 10 and two similar resistance measuring circuits connected across the power supply which has been designated generally by the reference numerals 12 and 12a, respectively.

The power supply 10 comprises portions 14 and 16 connected in series to provide a tapped connection which is referenced to ground at 18. The positive side of supply 10 connects to terminals 20 and 20a and the negative side connects to terminals 21 and 21a for delivering current to the bridges 12 and 12a.

Bridge circuit 12 comprises the series combination of resistors 22 and 24 in parallel with the series combination of resistors 26 and 28. Resistor 22 as shown has three lead wires, the resistances of which are designated 30, 32 and 34. Resistance thermometers are commonly supplied with three lead wires, and as described further below this bridge circuit gives excellent performance when resistor 22 is a platinum resistance thermometer having lead wires represented by said lead resistances labeled 30, 32 and 34. The lead wire indicated by the resistance 30 connects one end of the resistor 22 to resistor 24 and the lead wires denoted by the resistances 32 and 34 connect from the other end of resistor 22 to resistor 26 and to the output terminal of an operational amplifier 36. The output terminal of the amplifier 36 has been denoted by the reference numeral 38 and its two input terminals by the numerals 40 and 42, whereas its power terminals have been labeled 44 and 46. Resistors 24 and 28 connect to the negative power terminal 21 of the power supply 10.

A series combination of resistors 48, 50 and 52 connect in that respective order between the junction of resistors 24 and 30 and the junction of resistors 26 and 28. The junction of resistors 26 and 28 also connects to one signal output terminal 54 which provides the output signal relative to ground potential, a terminal 56 constituting the other output terminal and being connected directly to ground at 58. The junction of resistors 48 and 50 also connects to ground potential at 60. The differential signal input terminals 40, 42 of amplifier 36 connect to the junction of resistors 24, 30 and 48 and to the junction of resistors 50 and 52, respectively. Power is delivered to the terminal connection 44 of the operational amplifier 36 via terminal 20 and returns via terminal connection 46 through terminal 21.

The second bridge circuit shown generally at 12a is similar in operational respects to bridge 12, and connects between positive power terminal 20a and negative terminal 21a just as bridge circuit 12 connects between terminals 20 and 21. The sensor resistance 22a and its lead wires, whose resistances have been labeled 30a, 32a and 34a, correspond to resistor 22 and its lead wires of circuit 12. Similarly, the other components, since they may differ in value, have been distinguished by the suffix "a" from their counterparts in the circuit 12. It will be appreciated that virtually any number of bridge circuits may be connected to the supply 10, the two circuits 12 and 12a being only illustrative.

Referring specifically to the circuit designated 12 it may be noticed that any unbalance at the signal input terminals 40, 42 of amplifier 36 will cause a change in the output current flowing through terminal 38, which changed current will give rise to a changed output signal at terminal 54 and will reduce the differential input signal between the terminals 40, 42 to a value of substantially zero. Specifically, an increase in resistance 22 will provide a reduced voltage at the junction of resistors 24, 30 and 48, thereby giving a negative going signal to amplifier 36 at its input terminal 40. This negative signal causes a slightly increased current to flow from amplifier 36 via its output terminal 38 through the bridge resistors 22 and 30 in one bridge arm or path and an increased current proportional to the amplifier input signal through resistors 32 and 26 in a second bridge arm or parallel path. The increased current through resistor 26 produces a change in the bridge voltage output signal at terminal 54. While the current changes only slightly through the resistance 24, a relatively large increase in current occurs through the sensor resistor 22 and resistor 48 which is just sufficient to reinstate a substantially zero differential input across the terminals 40, 42 of the amplifier 36. It will be noted that a small portion of the voltage signal at the terminal 54 is present in the positive input at terminal 42 of the amplifier 36. If the positive input terminal 42 were connected to ground, there would be no "linearization" and in this case the voltage output signal appearing between the terminals 54, 56 would be linearly proportional to the resistance of resistor 22 rather than to temperature as described below for the specific example where resistor 22 is a platinum resistance thermometer.

The operation of the circuit can also be described analytically and is most clearly shown with a few assumptions. In this regard, it is desirable to assume an infinite gain for the amplifier 36 and a value tending to infinity for the sum of the resistors 50 and 52. The voltage signal sensed by amplifier 36 at the junction of resistors 50 and 52 may be designated as $KE_o$ where $E_o$ is the circuit output voltage at terminals 54 and 56. Then, letting $R_3$ equal resistor 24 and also resistor 28, $R_1$ equal resistor 22 plus resistor 30, $R_2$ equal resistor 26 plus resistor 32, $R_6$ equal resistor 48 and $V_B$ equal the voltage of power supply portion 16 as measured at terminal 21 referenced to tap 18; it is readily shown that:

$$E_o = \frac{-V_B R_6 (R_1 - R_2)}{R_6(R_2 + R_3) - K[R_1(R_3 + R_6) + R_3 R_6]}$$

The lead wire resistance 34, quite obviously, can be ignored and therefore doe not appear in the above equation.

The resistance of a platinum thermometer increases with temperature at a decreasing rate of change with temperature at any temperature above cryogenic levels. However, it may be seen from the above expression that an increase in $R_1$, which can be a platinum thermometer, causes a decrease in the denominator in addition to a proportional increase in the numerator. The net effect is to provide an output $E_o$ which may be selected to be substantially linearly proportional to temperature. The proper values of bridge resistors may be calculated knowing the relations between temperature and resistance for platinum, such analysis being most readily achieved by simulating the bridge circuit on a computer.

For example, it was desired to provide 1 millivolt per degree Fahrenheit for a bridge circuit employing a thermometer of precisely 100 ohms at 32° F. The results of Table I were obtained for a simulated excitation voltage $V_B$ of −15 VDC and for resistor values of 3,385 ohms for $R_3$ and $R_4$; 12 ohms for $R_6$; and 92.92 ohms for $R_2$. A satisfactory value of $K$ for good linearity was found to be 0.0095 for this example. The linearity between temperature and output voltage $E_o$ proved very good over a wide range as shown in Table I.

| Temperature | $R_1$ | $E_o$ (mv.) |
| --- | --- | --- |
| 0° F. | 92.92 | 0 |
| 200 | 136.59 | 199.932 |
| 400 | 178.81 | 400.222 |
| 600 | 239.44 | 600.568 |
| 800 | 258.92 | 800.542 |

TABLE I

For this example a selection of 99,050 ohm and 950 ohm for resistors 52 and 50, respectively would represent a large enough value to comply with the assumption regarding infinite value for their total resistance. If desired, one could substitute a high impedance amplifier for these particular resistors with the only real requirement being that the voltage signal to the amplifier 36 be substantially 0.0095 times the output signal $E_o$.

It has been also determined through more thorough analysis that the assumption of infinite voltage gain for amplifier 36 is practically valid so long as the gain is about 10,000 or greater. A gain of 10,000 gives an overall circuit sensitivity degradation equivalent to only about 0.3° F. for the 800° F. span. A commercially available amplifier which adequately fulfills the requirements for this example is marketed by Burr-Brown Research Corp., Tucson, Arizona as Model 3144/15. This is described as a general purpose operational amplifier having an output of ± 10 VDC and ± 20 ma. with ± 15 VDC excitation and open loop gain of 130 db. The input impedance is 500,000 ohms and output impedance is 500 ohms typically.

The effect of a change in lead wire resistance is readily determined by appropriately adjusting the values of resistors $R_1$ and $R_2$ and for the circuit example above it was found that a change equivalent to 10 ohms in both leads designated 30 and 32 gives a signal output change of about 0.5° F. maximum. Output voltage signal errors due to lead wire changes are proportional to bridge unbalance, of course, and thus go from zero at 0° F. to maximum error at 800° F. for the above example.

The bridge zero may be readily changed by adjusting $R_2$ and the sensitivity may be readily modified through a change in excitation $V_B$ as it is applied to resistors 24 and 28 (designated $R_3$ above). This could be accomplished either by changing $V_B$ directly or by adding a resistor between $V_B$ and resistors 24 and 28. Alternately, the size of resistors 24 and 28 could be suitably changed.

It is important that the power supply portion 16 be of a known stable value since its magnitude directly influences the output signal at terminals 54 and 56. However, the other portion 14 does not directly influence the circuit operation and it is only essential that it be of sufficient size to maintain amplifier 36 in a good operating region. The power supply tap to ground at 18 then does not have to be at a precisely determined potential with respect to 14.

As shown, a plurality of bridge circuits 12, 12a (and additional ones not depicted) may be operated from the common power supply 10 with each bridge characterized by a separate resistance sensor 22 and 22a, etc. and having a separate bridge circuit output signal. The sensor resistance may typically be located remote from the remainder of the respective circuit in which case the lead wire resistances 30, 32, 34 and 30a, 32a, 34a will be of significant value relative to the sensor. The three lead wire circuit as shown is important for accurate sensing. All circuit output signals are referenced to a common potential which as shown may be a ground reference and the power supply also has reference to this same ground potential. This system is specially suitable then for multipoint scanning measurements where a switching means is established to connect repetitiously and sequentially to a number of circuits for successive sampling and transmission of the individual signals which relate to separate measurements which in the specific example above would be temperatures sensed by platinum resistance thermometers. With regard to scanning, it is to be noted that the scanning from signal terminal 54 to signal terminal 54a affords a facile comparison of the output signals from the two respective networks or circuits 12, 12a because each reading is with respect to ground and hence the second signal can be accurately compared with the first. As already indicated, the plurality of circuits 12, 12a can be increased to virtually any number, all being energized from the same power supply 10.

The circuits would also be suitable for a variety of resistance input signals such as may occur from a piezoresistive effect or a photoresistive effect for example. The degree of curve shaping or "linearization" desired for a specific design may be selected by varying the "$K$" factor, as discussed above. This description of the linearization feature has been specific to the case where one wants to compensate for a decreasing sensitivity of the resistance sensor, however, from the above disclosure it should be clear that an increasing sensitivity could also be compensated for by modifying the circuit slightly so that the portion $K$ of the output signal is delivered to the amplifier as a negative input signal rather than a positive signal.

I claim:

1. A linearized resistance bridge circuit comprising first and second serially connected resistance means, the resistive value of said first means varying due to changes in the magnitude of a variable condition, third and fourth serially connected resistance means, said third and fourth resistance means being connected in parallel with said first and second resistance means, a tapped direct current power supply having its tap connected to a reference potential point, an operational amplifier having one power terminal connected to one side of said power supply and a second power terminal connected to the other side thereof and to the junction of said second and fourth resistance means, said operational amplifier also having input terminal means including first and second input terminals responsive to any difference in voltage applied thereto and an output terminal providing an output current to said first and third resistance means, said current varying in accordance with any such voltage difference applied to said input terminals, fifth resistance means connected at one end to the junction of said first and second resistance means and to said first input terminal and connected at its other end to said reference potential point, a pair of output signal terminals, one of said signal terminals being connected to the junction of said third and fourth resistance means and the other of said signal terminals being connected to said reference potential point, and means connected between said one signal terminal and said reference potential point for impressing a portion of the output signal voltage between said signal terminals to the input terminal means of said operational amplifier, whereby the magnitude of said output signal has a desired degree of linearity with respect to the resistive value of said first resistance means.

2. The bridge circuit as defined in claim 1 in which said last-mentioned means includes sixth and seventh serially connected resistance means, one end of said sixth resistance means being connected to said reference terminal point and one end of said seventh resistance means being connected to said one signal terminal and the other ends of said sixth and seventh resistance means being connected to each other and to said second input terminal.

3. The bridge circuit as defined in claim 2 in which the resistive value of said seventh resistance means is appreciably greater than that of said sixth resistance means and the resistive value of said fifth resistance means is appreciably less than that of said sixth resistance means.

4. The bridge circuit as defined in claim 1 in which said reference potential point constitutes a common ground.

5. The bridge circuit as defined in claim 1 in which said first resistance means includes a temperature responsive resistance plus the resistance of one lead wire connected in series therewith, said third resistance means including a selected fixed resistance plus the resistance of a second lead wire connected in series therewith, and said circuit further including the resistance of a third lead wire connected between the output terminal of said operational amplifier and the junction of said first and third resistance means.

6. The bridge circuit as defined in claim 5 in which said second and fourth resistance means each includes a selected fixed resistance.

7. The bridge circuit as defined in claim 6 in which said second and fourth resistance means are equal and in which:

$$E_o = \frac{-V_B R_6 (R_1 - R_2)}{R_6(R_2 + R_3) - K[R_1(R_3 + R_6) + R_3 R_6]}$$

where $E_o$ = the output voltage signal $V_B$ = the voltage provided by the portion of the power supply between its said other side and said reference potential point $R_1$ = the resistive value of said first resistance means $R_2$ = the resistive value of said third resistance means $R_3$ = the resistive value of said second and fourth resistance means $R_6$ = the resistive value of said fifth resistance means $K$ = a desired portion of $E_o$.

8. Curve shaping bridge circuitry comprising a bridge circuit including first and second serially connected resistance means, the resistive value of said first means varying due to changes in the magnitude of a variable condition, third and fourth serially connected resistance means, said third and fourth resistance means being connected in parallel with said first and second resistance means, an operational amplifier having first and second input terminals responsive to any difference in potential applied thereto and an output terminal providing an output in accordance with any potential difference applied to said input terminals, said output terminal being connected to the junction of said first and third resistance means for supplying current to said junction, fifth resistance means connected between the junction of said first and second resistance means and ground, said first input terminal of said amplifier being connected to the junction of said first and second resistance means and hence to the end of said fifth resistance means remote from its grounded end, a first output signal terminal connected to said junction between said third and fourth resistance means, a second output signal terminal connected to ground, means connected between said first output signal terminal and ground for impressing a portion of the output signal between said signal terminals to the second input terminal of said operational amplifier, and power supply means for supplying power to said operational amplifier, said power supply means including a ground connection and furnishing a potential differing from ground potential to the junction of said second and fourth resistance means.

9. Curve shaping bridge circuitry as defined in claim 8 in which said means for impressing a portion of the output signal to the second input terminal of said operational amplifier includes sixth and seventh serially connected resistance means, said second input terminal being connected to the junction of said sixth and seventh resistance means.

* * * * *

UNITED STATES PATENT OFFICE
CERTIFICATE OF CORRECTION

Patent No. 3,651,696      Dated March 28, 1972

Inventor(s) Robert C. Rose

It is certified that error appears in the above-identified patent and that said Letters Patent are hereby corrected as shown below:

Column 1, Line 12 "an" should be --Linearized--; Column 1, Line 13, "a" (second occurence) should be --an--.

Signed and sealed this 25th day of July 1972.

(SEAL)
Attest:

EDWARD M. FLETCHER, JR.
Attesting Officer

ROBERT GOTTSCHALK
Commissioner of Patents